Dec. 10, 1968 K. V. JAHNS ET AL 3,416,032

LAMP DIMMING CIRCUIT

Filed March 23, 1966

Inventors
KENNETH V. JAHNS
ARNOLD S. BRENNER

BY

Mueller, Aichele & Rauner
ATTYS.

3,416,032
LAMP DIMMING CIRCUIT

Kenneth V. Jahns, West Chicago, and Arnold S. Brenner, Skokie, Ill., assignors to Motorola, Inc., Franklin Park, Ill., a corporation of Illinois Filed Mar. 23, 1966, Ser. No. 536,709
8 Claims. (Cl. 315—149)

Figures 1, 2, 3:
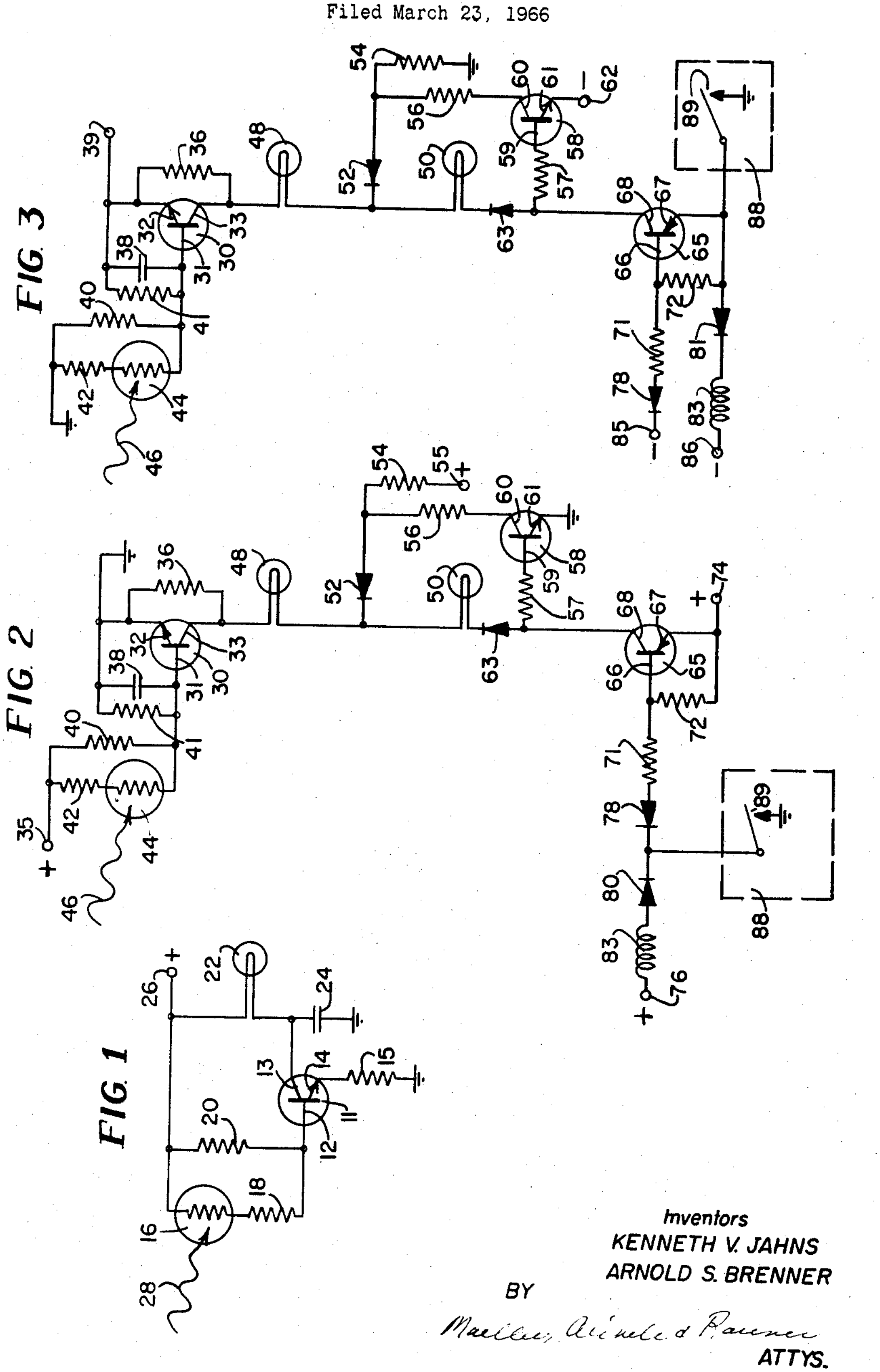

This invention relates to pilot light dimmer circuits and in particular to a circuit which maintains substantially constant contrast between the brightness of a pilot light and the ambient light.

Pilot lights are widely used in electronic equipment to indicate the status of the equipment. It is important that the light output of the pilot light be sufficient to enable the person monitoring the light to determine the status of the equipment quickly. However, if the ambient light conditions under which the equipment is used change, a pilot light sufficiently bright for high ambient light conditions will become annoyingly bright or even dangerously bright under low ambient light conditions. This is particularly troublesome in mobile equipment where the location of the electronic equipment is constantly changing and wherein the equipment is used extensively, both in daylight and night hours.

Manual control circuits such as a rheostat have previously been used to regulate the brightness of pilot lights. However, the brightness level of the lights must be constantly adjusted and where light levels change rapidly, this becomes annoying. In systems where some pilot lamps are energized only intermittently during the operation of the electronics equipment, a rheostat control would cause the brightness of the lamps to change as additional lamps were intermittently energized.

Accordingly, it is an object of this invention to provide a pilot light dimmer circuit which operates automatically to maintain a substantially constant contrast between the pilot light and the ambient light.

Another object of this invention is the provision of a pilot light dimmer circuit operative to automatically control the brightness of pilot lamps which are constantly energized in combination with other pilot lamps which are intermittently energized.

A feature of this invention is the provision of a pilot lamp dimmer circuit having a transistor in series with the pilot lamp. Light sensitive resistance means controls the flow of base current through the transistor to thereby regulate the flow of current through the pilot lamp.

Another feature of this invention is the provision of a pilot lamp dimmer circuit which switches compensating resistance out of the circuit when additional pilot lamps are energized to compensate for the additional load presented by the intermittently energized pilot lamps.

The invention is illustrated in the drawings in which:

FIG. 1 is a schematic showing of one embodiment of this invention suitable for use with constantly energized pilot lamps;

FIG. 2 is a schematic showing of a second embodiment of this invention which is adapted for use with pilot lamps which are constantly energized as well as pilot lamps which are intermittently energized and in which the power supply of the system has a negative ground; and FIG. 3 is a schematic showing another embodiment of the circuit of FIG. 2 in which the power supply of the system has a positive ground.

In practicing the invention, a transistor is coupled in series with the pilot lamps, which are to be controlled, to regulate the magnitude of the current through the pilot lamps. A light sensitive resistance element is connected between the power supply and the control electrode of the transistor to control the control current applied to the transistor in response to variations in the ambient brightness and thus the current flowing through the transistor and the pilot lamps. In another embodiment of this invention, compensating resistance means are coupled in series with the transistor and the constantly energized pilot lamp. Intermittently energized pilot lamps are also provided and are coupled to the constantly energized pilot lamps by switching means. Energization of the intermittently energized pilot lamps automatically switches the compensating resistance means out of the current path in order to maintain the correct current flow through the pilot lamps as regulated by the light sensitive resistance means.

Referring to FIG. 1, there is shown a schematic of an embodiment of this invention suitable for use with constantly energized pilot lamps. Pilot lamp 22 is coupled between collector 13 of transistor 11 and terminal 26 which is adapted to receive a positive supply potential. Resistor 15 is coupled between emitter 14 of transistor 11 and a reference potential. Light sensitive resistor 16 in series with resistor 18 is coupled between terminal 26 and base 12 of transistor 11. Resistor 20 is coupled between terminal 26 and base 12 of transistor 11. Capacitor 24, connected between collector 13 and a reference potential, is provided to bypass alternating current oscillations which may develop.

In operation the ambient light, represented by light ray 28, strikes light sensitive resistor 16 to control its resistance. An increase in the magnitude of the ambient light causes a decrease in the resistance of light sensitive resistor 16 thus increasing the base emitter control current of transistor 11. The increase in control current causes an increase in the current flowing from terminal 26 through pilot lamp 22, collector 13 and emitter 14 of transistor 11 to the reference potential, increasing the brightness of pilot lamp 22. A decrease in the ambient light will cause an increase in the resistance of light sensitive resistor 16 thereby reducing the control current. The decrease in the control current causes a decrease in the current flowing through transistor 11 and pilot lamp 22 thus reducing the brightness of the pilot lamp.

In FIG. 2 there is shown a schematic of a circuit adapted to control a pilot lamp which is continuously energized and also a pilot lamp which is intermittently energized to maintain a substantially constant brightness contrast between the ambient light and the pilot lamps in their energized condition. The circuit shown may be used in a mobile communications transmitter wherein lamp 48 is energized to show that the transmitter is turned on while lamp 50 is energized, when the push-to-talk switch 89 on microphone 88 is energized. The circuit of FIG. 2 is adapted to be used with a vehicular electrical system having a negative ground.

Transistor 30 is provided to control the flow of current through the lamps which are energized to regulate their brightness. Emitter 32 of transistor 30 is coupled to a reference potential and collector 33 is connected to lamp 48. Resistor 40 is connected in parallel with resistor 42 and light sensitive resistor 44 between potential supply terminal 35 and base 31 of transistor 30. Resistor 41 and capacitor 48 are coupled in parallel between base 31 of transistor 30 and the reference potential. Resistors 40, 42, 44 and 41 provide a bias control current for regulating the flow of current from collector 33 to emitter 32 of transistor 30. Lamp 48 is coupled to terminal 55 through resistor 54 and diode 52. A second lamp 50, which is to be intermittently energized, is coupled to lamp 48 and diode 52. Lamp 50 is also coupled to collector 68 of transistor 65 through diode 63. Emitter 67 of transistor 65 is coupled to potential supply terminal 74 and also to base 66 through resistor 72. Push-to-talk relay 83, diodes 80 and 78 and resistor 71 are connected in series between base 66 of transistor 65 and potential supply terminal 76.

Push-to-talk switch 89, positioned on microphone 88, is coupled between the reference potential and the junction of diodes 80 and 78.

A switching transistor 58 is provided to control the flow of current through resistor 54. Base 59 of transistor 58 is connected to collector 68 of transistor 65 through resistor 57. Diode 52 and resistor 54 are connected to collector 60 of transistor 58 through resistor 56 and emitter 61 of transistor 58 is connected to a reference potential.

In operation, lamp 48 is normally energized when the unit is turned on or in the standby condition while lamp 50 is not energized. Current flows from terminal 55 through resistor 54, diode 52, lamp 48, collector 33 and emitter 32 of transistor 30 to a reference potential. Current also flows through resistor 36 connected in parallel with transistor 30. Resistor 36 provides a minimum value of curent through lamp 48 and thus a minimum brightness for the lamp. Light sensitive resistor 44 is positioned so as to receive the ambient light represented by light ray 46. The variations in resistance of light sensitive resistor 44 act to regulate the control current to base 31 so that the brightness of lamp 48 is regulated to maintain a substantially constant brightness ratio between lamp 48 and the ambient light. capacitor 38 is provided to prevent the negative resistance characteristics of light sensitive resistor 44 from causing oscillations to develop. With push-to-talk switch 89 open, the potential on base 66 and emitter 67 of transistor 65 are equal thereby biasing transistor 65 to non-conduction. With transistor 65 biased to non-conduction, transistor 58 is also biased to non-conduction, therefore, no current can flow through lamp 50.

When push-to-talk switch 89 is closed, the junction point of diodes 78 and 80 is placed at the reference potential and push-to-talk relay 83 is energized. Current also flows from terminal 74 through resistors 72 and 71 and diode 78 producing a potential between base 66 and emitter 67 of transistor 65 which biases transistor 65 to conduction. With transistor 65 biased to conduction, current flows from terminal 74 through transistor 65, diode 63, lamp 50, lamp 48 and transistor 30 to the reference potential thus energizing both lamps 50 and 48. With transistor 65 energized, the potential on base 59 of transistor 58 rises biasing transistor 58 to conduction. With transistor 58 biased to conduction, current flows from terminal 55 through resistors 54 and 56 and through transistor 58 to the reference potential. This reduces the potential on diode 52 biasing diode 52 to non-conduction so that resistor 54 is effectively removed from the series circuit with lamp 48. Resistor 54 is the same nominal value as the resistance of lamp 50 so that the current through lamps 48 and 50 is substantially the same as the current through lamp 48 with lamp 50 unenergized. Thus, the brightness of each lamp is controlled by the control current at the base of transistor 30.

FIG. 3 is a schematic of a circuit adapted to be used in a mobile communications unit and with an electronic system which has a positive ground. Those portions of the circuit of FIG. 3 which are the same as FIG. 2 have the same reference numbers. Resistors 42 and 40 are connected to a reference potential and emitter 32 of transistor 30 is connected to negative potential terminal 39. Resistor 54 is connected to a reference potential and emitter 61 of transistor 58 is connected to negative potential terminal 62. Base 66 of transistor 65 is connected to negative potential terminal 85 through resistor 71 and diode 78. Emitter 67 of transistor 65 is connected to negative potential terminal 86 through diode 81 and push-to-talk relay coil 83. Emitter 67 is also connected to a reference potential through normally open push-to-talk switch 89.

In operation, with push-to-talk switch 89 open, current flows from the reference potential through resistor 54, diode 52, lamp 48 and transistor 30 to terminal 39. The flow of current through transistor 30 is controlled by the bias control current supplied by the resistor network consisting of resistors 40, 42, 44 and 41. The magnitude of the bias control current and thus the brightness of lamp 48 is controlled by the magnitude of the ambient light 46 striking light sensitive resistor 44 as previously explained.

The negative potential applied from terminals 85 and 86 to base 66 and emitter 67 of transistor 65 will bias transistor 65 into non-conduction and thus transistor 58 is biased to non-conduction. When push-to-talk switch 89 is closed, emitter 67 is established at the reference potential and push-to-talk relay 83 is energized by current flowing from the reference potential through switch 89, diode 81 and relay coil 83 to terminal 86. Current also flows from the reference potential through switch 89, resistors 72 and 71 and diode 78 to terminal 85. Base 66 is biased negative with respect to emitter 67 biasing transistor 65 to conduction. Current flowing through transistor 65 acts to bias transistor 58 to conduction as previously described. The current flowing through transistor 65 also flows through diode 63, lamp 50, lamp 48 and transistor 30 to terminal 39 as previously described. With transistor 58 biased to conduction, current flows through resistors 54 and 56 and transistor 58 to terminal 62. This flow of current through resistors 54 and 56 biases diode 52 to non-conduction. Thus, lamps 48 and 50 are connected in series and since the current through each is the same, they will have the same brightness level. The current through each lamp and thus the brightness level of both lamps is controlled by transistor 30 so that a substantially constant brightness contrast is maintained between lamps 48 and 50 and the ambient light.

Thus, a circuit has been shown for automatically controlling the brightness level of a pilot lamp to maintain a substantially constant brightness contrast between the pilot lamp and ambient light. Provisions are made for use in vehicular systems having both positive and negative ground electrical systems. Provision is also made for the control of the brightness of intermittently energized pilot lamps.

We claim:

1. A circuit for automatically varying the brightness of a pilot lamp to produce a substantially constant brightness contrast between the pilot lamp and the ambient light, including in combination, a transistor having a first electrode coupled to a reference potential, a second electrode and a control electrode, control circuit means coupled to said control electrode for supplying a control current thereto, said control circuit means including light sensitive resistance means positioned to receive the ambient light and being responsive thereto to vary the magnitude of said control current directly as the magnitude of the ambient light varies, lighting circuit means including first and second pilot lamps coupled to said second electrode, current supply circuit means coupled to said lighting circuit means and adapted to supply a lighting current to said lighting circuit means and said transistor, said current supply circuit means including resistance means coupled to said first pilot lamp for supplying said lighting current thereto, said current supply circuit means further including switching means coupled to said resistance means and said second pilot lamp, operating means coupled to said switching means for intermittently energizing said switching means, said switching means in said energized condition being adapted to supply said lighting current, said switching means being responsive to energization by said operating means to decouple said resistance means from said first pilot lamp and to couple said second pilot lamp in series with said first pilot lamp, whereby said lighting current flows through both said first and second pilot lamps and said transistor, said transistor acting to regulate said lighting current in response to said variation in the magnitude of said control current whereby the brightness of said first and second pilot lamps is varied to maintain a substantially constant brightness contrast between said first and second pilot lamps and the ambient light.

2. A circuit for automatically varying the brightness of a pilot lamp to produce a substantially constant brightness contrast between the pilot lamp and the ambient light, including in combination, light sensitive current regulating means adapted to receive a lighting current and positioned to receive the ambient light, first pilot lamp means and resistance means series coupled to said light sensitive current regulating means whereby said lighting current flows through said light sensitive current regulating means, said first pilot lamp means and said resistance means, said first pilot lamp means being responsive to said lighting current to be energized thereby and said light sensitive current regulating means being responsive to the ambient light to vary the magnitude of said lighting current, whereby the brightness of said first pilot lamp means is varied to maintain a substantially constant brightness contrast between said first pilot lamp means and the ambient light, switching means coupled to said resistance means and including operating means for intermittently energizing said switching means, second pilot lamp means coupled to said switching means, said switching means being responsive to energization by said operating means to decouple said resistance means from said first pilot lamp means and to couple said second pilot lamp means in series therewith, whereby said lighting current flows through said first and second pilot lamp means and said light sensitive current regulating means, substantially unchanged in magnitude to maintain said brightness contrast between said first and second pilot lamp means and the ambient light.

3. The circuit according to claim 2 wherein said light sensitive current regulating means includes a transistor having a first electrode adapted to receive said lighting current, a second electrode and a control electrode, said light sensitive current regulating means further including control circuit means coupled to said control electrode for supplying a control current thereto, said control circuit means including light sensitive resistance means positioned to receive the ambient light and being responsive thereto to vary the magnitude of said control current directly as the magnitude of the ambient light varies, circuit means coupling said second electrode to said first pilot lamp means for supplying said lighting current thereto, said transistor being responsive to said control current to regulate the magnitude of said lighting current whereby a substantially constant brightness contrast is maintained between said first pilot lamp means and the ambient light.

4. The circuit according to claim 2 wherein said first pilot lamp means includes a first pilot lamp series coupled with said resistance means, said first pilot lamp being responsive to said lighting current to be continuously energized thereby, the magnitude of said lighting current being determined by said light sensitive current regulating means and said first pilot lamp and said resistance means coupled in series, said second pilot lamp means including a second pilot lamp coupled to said switching means, said switching means in said energized condition being operative to decouple said resistance means from said first pilot lamp and to couple said second pilot lamp in series with said first pilot lamp to thereby energize said second pilot lamp, the magnitude of said lighting current with said second pilot lamp energized being determined by said light sensitive current regulating means and said first and second pilot lamps coupled in series, the resistance of said second pilot lamp being substantially equal to the resistance of said resistance means whereby said lighting current remains constant during said intermittent energization of said second pilot lamp.

5. The circuit according to claim 2 wherein said operating means includes a manually operated switch, said second pilot lamp means being energized to indicate the operation of said manually operated switch.

6. The circuit according to claim 2 wherein said first pilot lamp means includes a first pilot lamp coupled to said light sensitive current regulating means, said resistance means including a resistor adapted to receive a first potential, said second pilot lamp means includes a second pilot lamp connected to said first pilot lamp, said switching means includes a first diode connecting said first and second pilot lamps to said resistor, a second diode connected to said second pilot lamp, circuit means coupling said second diode to said operating means, said switching means further including a first transistor having an emitter electrode adapted to receive a second potential, a base electrode conductively coupled to said second diode and said circuit means and a collector electrode conductively coupled to said first diode and said resistor, said first transistor and said second diode being normally biased to be non-conductive whereby said lamp current flows through said first pilot lamp and said resistor, said circuit means being responsive to said energization of said switching means to bias said second diode and said first transistor to conduction, said first transistor in a conductive condition acting to bias said first diode to nonconduction whereby said lamp current flows through said first and second pilot lamps.

7. The circuit according to claim 6 wherein said circuit means includes a second transistor having an emitter electrode adapted to receive said first potential, a collector electrode coupled to said second diode and said base electrode of said first transistor, and a base electrode conductively coupled to said emitter electrode of said second transistor, a load, a manually operated switch adapted to receive said second potential, a third diode coupling said manually operated switch to said load, and a fourth diode connected to said manually operated switch and said third diode, said fourth diode further being conductively coupled to said base electrode of said second transistor, operation of said manually operated switch acting to bias said second transistor to conduction whereby said second diode and said first transistor are biased to conduction.

8. The circuit according to claim 6 wherein said circuit means includes a second transistor having a collector electrode coupled to said second diode and said base electrode of said first transistor, an emitter electrode and a base electrode conductively coupled to said emitter electrode, a manually operated switch adapted to receive said first potential and coupled to said emitter electrode of said second transistor, a load, a third diode coupling said manually operated switch to said load, and a fourth diode adapted to receive said second potential and conductively coupled to said base electrode of said second transistor, operation of said manually operated switch acting to bias said second transistor to conduction whereby said second diode and said first transistor are biased to conduction.

References Cited

FOREIGN PATENTS

| | | |
|---|---|---|
| 1,014,104 | 12/1965 | Great Britain. |
| 1,110,683 | 7/1961 | Germany. |

JAMES W. LAWRENCE, *Primary Examiner.*

P. C. DEMEO, *Assistant Examiner.*

U.S. Cl. X.R.

315—158; 250—205